United States Patent

Bedford et al.

[11] Patent Number: 5,806,412
[45] Date of Patent: *Sep. 15, 1998

[54] GAS COOKING APPARATUS

[75] Inventors: James P. Bedford, Willoughby; Gary R. Fortuna, Willoughby Hills, both of Ohio; Wayne S. Hollingshead, Ontario, Canada; David S. Schwerzler, Chagrin Falls; Thomas J. Willis, Solon, both of Ohio

[73] Assignee: Cleveland Range, Inc., Cleveland, Ohio

[*] Notice: The term of this patent shall not extend beyond the expiration date of Pat. No. 5,644,975.

[21] Appl. No.: 755,028

[22] Filed: Nov. 22, 1996

Related U.S. Application Data

[63] Continuation of Ser. No. 463,998, Jun. 5, 1995, Pat. No. 5,644,975.
[51] Int. Cl.⁶ ...................................................... A47J 37/12
[52] U.S. Cl. .................. 99/447; 99/424; 99/409; 126/391; 126/41 R
[58] Field of Search .............................. 99/403, 407, 409, 99/385, 424, 447; 126/39 R, 41 R, 390, 391, 392

[56] References Cited

U.S. PATENT DOCUMENTS

| 3,060,922 | 10/1962 | Wilson . |
| 3,489,133 | 1/1970 | Kells et al. . |
| 3,744,475 | 7/1973 | Myler et al. . |
| 3,760,793 | 9/1973 | Anetsberger et al. . |
| 3,797,377 | 3/1974 | Lotter et al. ................................ 99/407 |
| 4,751,915 | 6/1988 | Price ........................................ 126/391 |
| 4,858,592 | 8/1989 | Haycek et al. ........................... 126/373 |
| 4,930,489 | 6/1990 | McFadden ............................. 126/41 R |

*Primary Examiner*—Reginald L. Alexander
*Attorney, Agent, or Firm*—Ohlandt, Greeley, Ruggiero & Perle

[57] ABSTRACT

A gas cooking apparatus is disclosed having a gas combustion chamber with a single burner and a baffle enclosed therein. The baffle comprises a series of graduated restrictions designed to control the propagation of combustion gases through the combustion chamber. The baffle permits the use of a unique high power burner.

17 Claims, 7 Drawing Sheets

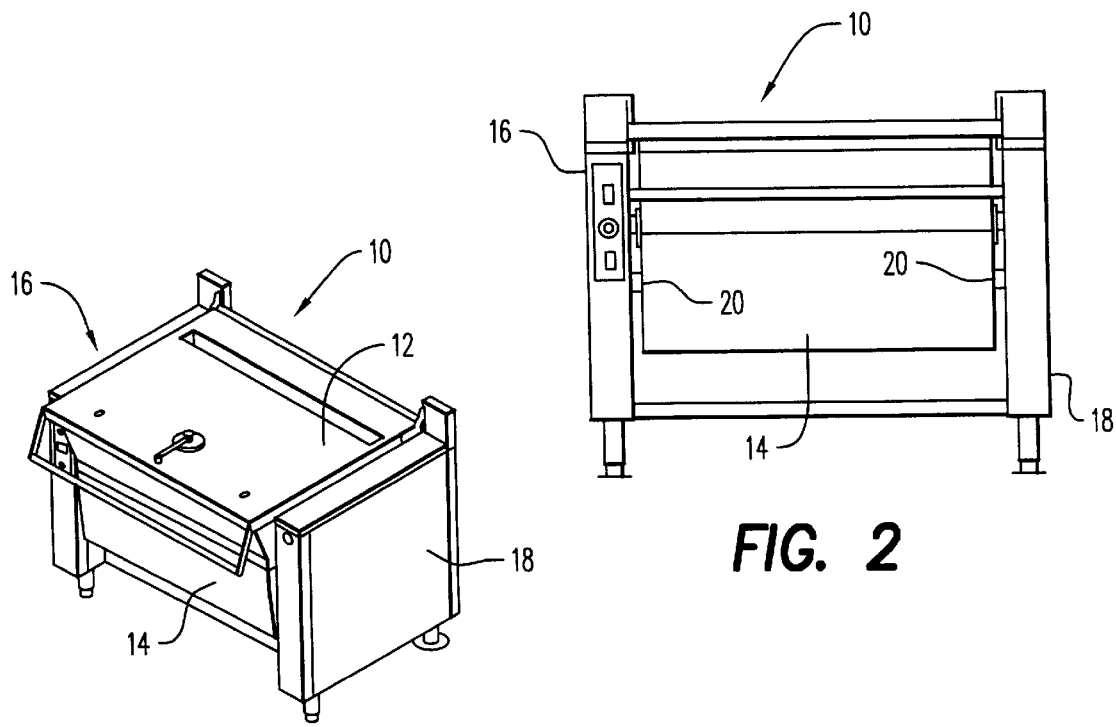
FIG. 1
FIG. 2
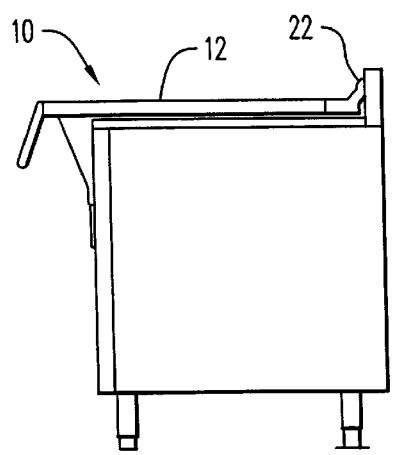
FIG. 3
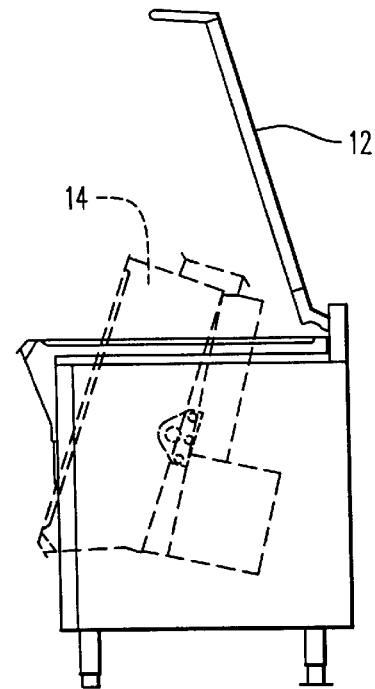
FIG. 4

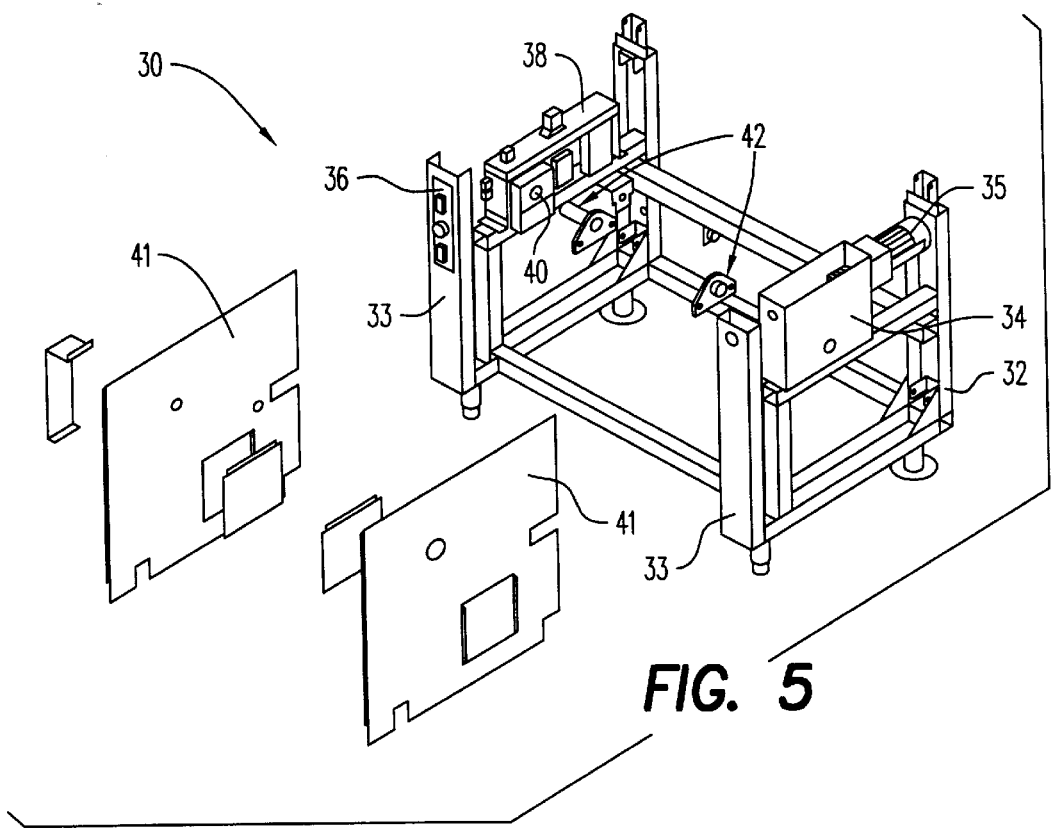
FIG. 5
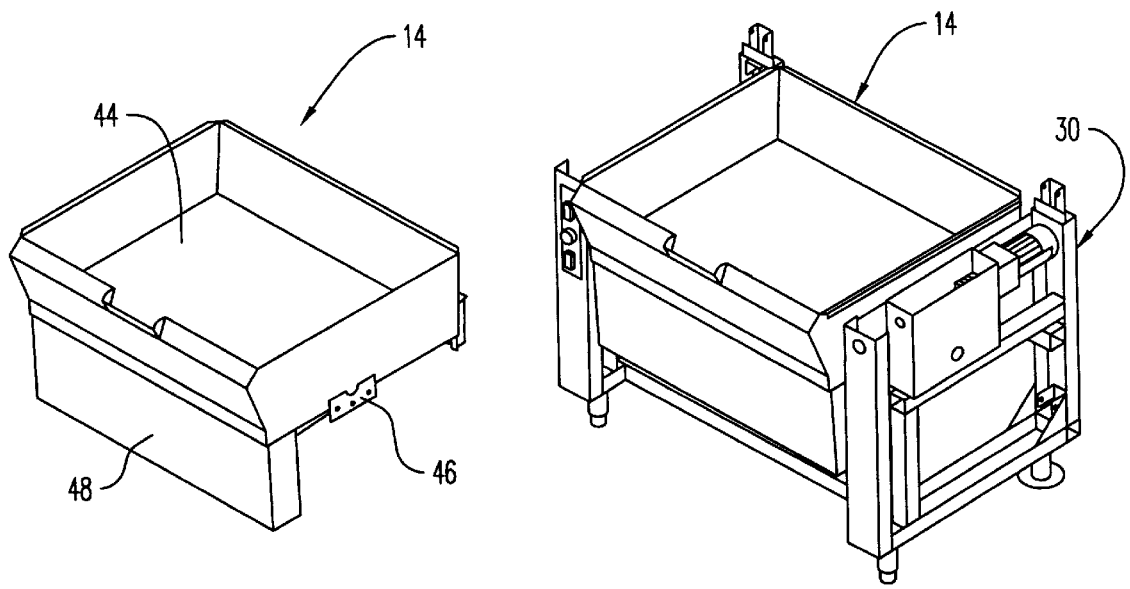
FIG. 6   FIG. 7

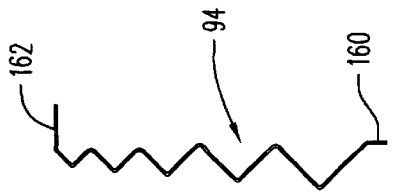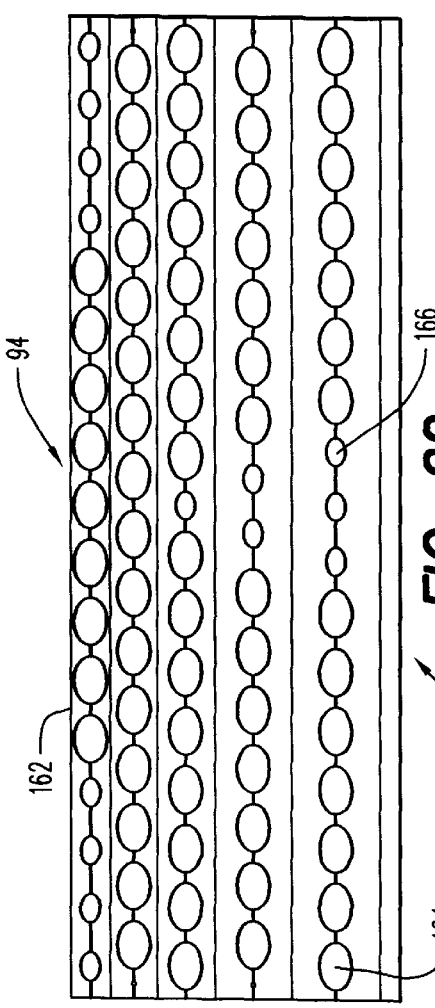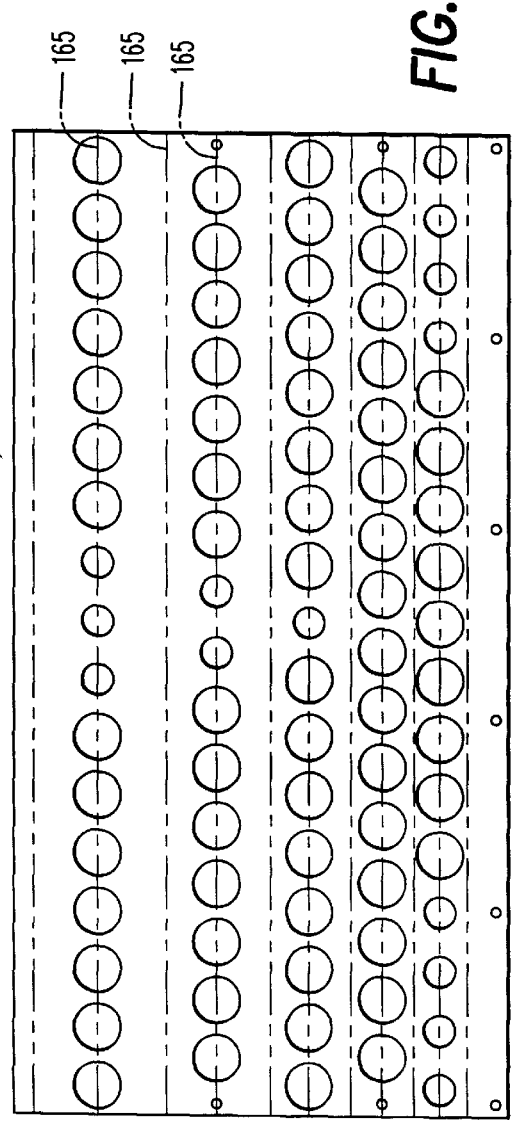

GAS COOKING APPARATUS

This application is a continuation of application Ser. No. 08/463,998, filed Jun. 5, 1995, now U.S. Pat. No. 5,644,975.

BACKGROUND AND SUMMARY OF THE INVENTION

The present invention relates generally to gas cooking devices and more particularly to an arrangement for providing a high power, high efficiency gas cooking apparatus.

The advantages of a gas cooking apparatus have been well recognized over the years. A gas cooking apparatus can quickly bring a heated surface to a desired temperature and may provide a high rate of heat exchange. The use of a heated surface, as opposed to a direct flame, allows cooking directly on the surface of the cooking apparatus as when grilling, brazing, frying or simmering.

Current gas cooking apparatuses may utilize multiple rows of burners located in various locations beneath the heated surface. The fuel is provided to a series of tubes with nozzles that burn the fuel in discrete locations. The use of several burners can cause several problems. Because each individual nozzle provides a discrete flame to a limited area, the heated surface develops hot and cold zones. Hot zones develop directly over each individual nozzle flame and cool zones develop between the nozzle flames. Previous attempts at solving this problem have been directed toward controlling the design of the burner placement under the heated surface. These efforts have resulted in elaborate and costly burners that merely multiply the number of hot and cold zones on the heated surface. Such elaborate burners require a correspondingly high degree of maintenance to ensure efficient operation. There is a need for an apparatus that combusts gas in such a way as to provide a uniformly heated surface to improve cooking performance.

Additionally, previous gas cooking apparatuses have had great difficulty in burning gas at a high rate in an efficient manner. As a result, gas cooking apparatuses were limited to brazing and simmering and did not have the capability to fry or to boil.

The present invention is a highly efficient and powerful gas cooking apparatus that provides even heat distribution to a surface. The present invention is a gas cooking apparatus having an enclosed gas combustion chamber that may simply be attached below a surface to be heated. The gas combustion chamber of the present invention may be bolted to the surface. The gas combustion, chamber includes a pilot system, a large capacity burner, an open plenum chamber, and a controlled flame pattern baffle. The gas combustion chamber is enclosed below by a burner pan that serves to control the combustion of the gas within the chamber and also serves as a heat shield. The power and efficiency of the present invention allows one to fry and simmer. Prior systems do not have the capability to fly or simmer. Additionally, the power and efficiency of the present invention greatly increases the heat exchange rate of the gas cooking apparatus. For example, the present invention has the ability to bring water to a boil in ½ to ⅓ the amount of time required by previous gas cooking apparatuses.

The gas combustion chamber of the present invention evenly distributes heat to a surface by providing three zones of effect. Zone I experiences direct flame contact over the secondary burner, Zone II is an open plenum chamber with a saturated plate surface effect, and Zone III uses a controlled flame pattern baffle with graduated restrictions.

The present invention may use a novel single tee burner. Preferably, the burner has a central intake opening to an inner air/fuel distribution manifold within a tubular burner. The inner air/fuel distribution manifold may use holes of varying size and quantity to provide an evenly balanced distribution of an air/fuel mixture.

The present invention may use a pilot system which greatly improves pilot flame size and output. Such pilot flame improvements result in near instantaneous burner ignition. Burner ignition has been a problem especially associated with large or long burner assemblies. Large burners may either only partially light or blow big and dangerously. Traditionally, pilots has utilized an ambient air source. The present invention provides pressurized air to the pilot located within the combustion chamber. The pilot of the present invention provides burner ignition which is smoother, effective and faster than previous systems.

The present invention may also use a controlled flame pattern baffle which controls flame and hot gas propagation through the gas combustion chamber and also serves to suppress sound. The baffle has obstructions with varying size holes and spacing. The baffle may comprise a series of angles or channels. Alternatively, the baffle may comprise a plate having a series of bends to provide an open triangular design. An open triangular design improves pan strength, warp resistance, heat conductivity and significantly reduces noise or sound output of the gas cooking,, apparatus over channel baffles. The size of the triangular bends, and the size, shape and location of openings within the baffle may be varied to control flame and gas propagation through the combustion chamber.

The present invention may use a unique air and gas mixing chamber. A pintle style gas injection nozzle may be place within an orthogonal mixing chamber having corners. Air may be forced into the mixing chamber and the mixing chamber may induce turbulence to the air and gas flows to provide a highly effective mixing of the air and gas streams. A tubular manifold runner may be attached to the mixing chamber to ensure smooth efficient laminar delivery of the air and gas mixture to the distribution manifold or burner assembly. Previous systems utilized a Y-shaped junction of air and gas. The mixing chamber of the present invention mixes the air and gas much more effectively than prior systems.

The present invention may also provide versatility through a tilting mechanism and access designed for quick and easy maintenance. The present invention may provide either manual or electric motorized tilting of the gas component assembly. The gas component assembly of the present invention may be mounted to the cooking apparatus frame with plates bolted to shafts, which are supported by bearings within the frame. The shafts may be driven either manually or by electric motor. The gas component assembly may be easily removed from the front of the cooking apparatus frame by unbolting these plates. Previous gas skillets welded the skillet to the frame which made it difficult to remove or install. The gas component assembly may include all required components within an enclosure with electrical flex conduits and flexible gas lines pre-installed for simplified testing, assembly and service. Should the gas component assembly fail for any reason, the assembly may be completely removed and replaced with another. The failed assembly may then be analyzed and repaired without preventing use of the gas cooking apparatus.

The present invention additionally provides a high/low control switch to control the intensity of the combustion. Such high/low control switches have never before been present on gas cooking apparatuses. The use of such a high/low control switch by the present invention provides a large degree of versatility to the gas cooking apparatus.

These and other advantages will be apparent from the following detailed description of the invention, drawings, and claims.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 is a perspective view of one embodiment of a gas cooking apparatus of the present invention;

FIG. 2 is a front view of the gas cooking apparatus of FIG. 1;

FIG. 3 is a side view of the gas cooking apparatus of FIG. 1;

FIG. 4 is a side view of the gas cooking apparatus of FIG. 1 with the gas component assembly in full tilt position;

FIG. 5 is a perspective partially-exploded view of one embodiment of a frame assembly of the present invention;

FIG. 6 is a perspective view of one embodiment of a gas component assembly of the present invention;

FIG. 7 is a perspective view of the gas component assembly of FIG. 6 installed upon a frame assembly of the present invention as in FIG. 5;

FIG. 22 is an overhead view of one embodiment of a controlled flame pattern baffle of the present invention;

FIG. 23 is an end view of the baffle of FIG. 22; and

FIG. 24 is a developed view of the baffle of FIG. 22.

DETAILED DESCRIPTION OF PREFERRED EMBODIMENT(S)

Figure 8:
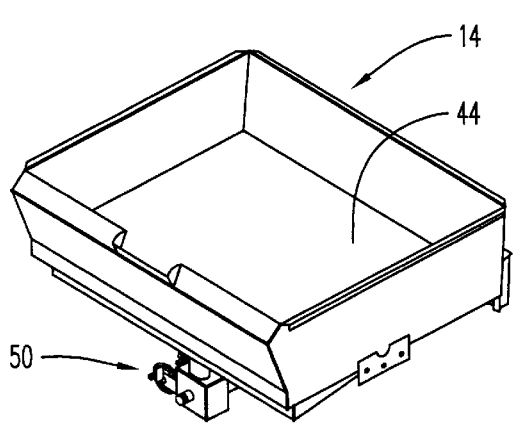
FIG. 8 is a perspective view of a burner and pan assembly of the gas component assembly of FIG. 6.

FIG. 1 is a perspective view of one preferred embodiment of a gas cooking apparatus 10 of the present invention. The gas cooking apparatus 10 has a lid 12 on a gas component assembly 14 and left 16 and right 18 sides. FIG. 2 is a front view of the gas cooking apparatus 10. The gas component assembly 14 may be attached to the left and right sides, 16 and 18, of the cooking apparatus frame assembly by pivoting hinges 20. A right side view of the gas cooking apparatus 10 is shown in FIG. 3. The lid 12 is hinged at 22 and may be lifted to an upright position as shown in FIG. 4. FIG. 4 also shows the gas component assembly 14 in full tilt position with dashed lines.

FIG. 5 shows a partially exploded view of one embodiment of a frame assembly 30 of the gas cooking apparatus 10 of the present invention. Frame assembly 30 has a support frame 32 which may comprise a fully unitized square tube weldment. Frame assembly 30 provides the rigidity and strength to carry load bearing stresses. As an example, one embodiment of a gas cooking apparatus frame assembly of the present invention may be designed to accommodate a 40 gallon load weight and the accompanying pivoting force requirements. Frame assembly 30 may have symmetrical side consoles 33 to improve strength, reduce manufacturing costs and improve packaging capability. Frame assembly 30 may accommodate a gear box 34 and electric drive motor 35 on one side and an electric box assembly 38 with corresponding controls 36 on the other. The frame assembly 30 of the present invention provides space adequate for a pivot shaft bearing 40, sheeting requirements 41, as well as other options such as a faucet installation. A shaft bearing 40 may be attached to frame assembly 30 opposite gear box 34. Shaft retainers 42 are pivotally attached to both the shaft bearing 40 and the gear box 34. The gear box 34 may be operated to rotate the shaft retainers 42.

Referring to FIG. 6 a gas component assembly 14 is shown. The gas component assembly 14 may have a pan assembly 44 with pan side plates 46 which are adapted to attach or bolt to shaft retainers 42. The gas component assembly 14 also has a front skirt 48. Removal of front skirt 48 quickly provides access to the internal components of the gas component assembly 14. FIG. 7 shows the gas component assembly 14 installed within the frame assembly 30.

Figure 9:
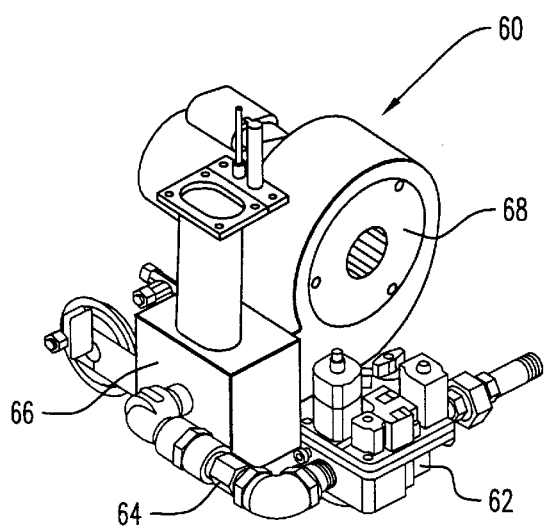
FIG. 9 is a perspective view of an air and gas supply system of the gas component assembly of FIG. 6.

Referring to FIG. 8, the gas component assembly 14 comprising a burner assembly 50 and a pan assembly 44. The front skirt 48 has been removed to permit viewing of and access to the burner assembly 50. FIG. 9 shows an air and gas supply system 60. The air and gas supply system 60 has a gas valve 62 for controlling the flow of fuel into the cooking apparatus. The gas valve 62 may feed a variable orifice 64 and in turn provide gas to an air and gas mixing chamber assembly 66. The variable orifice 64 may be interchanged to permit the use of differing fuels such as natural gas or liquid propane. A fan 68 may be attached to the mixing chamber 66 to supply air thereto.

Figure 10:
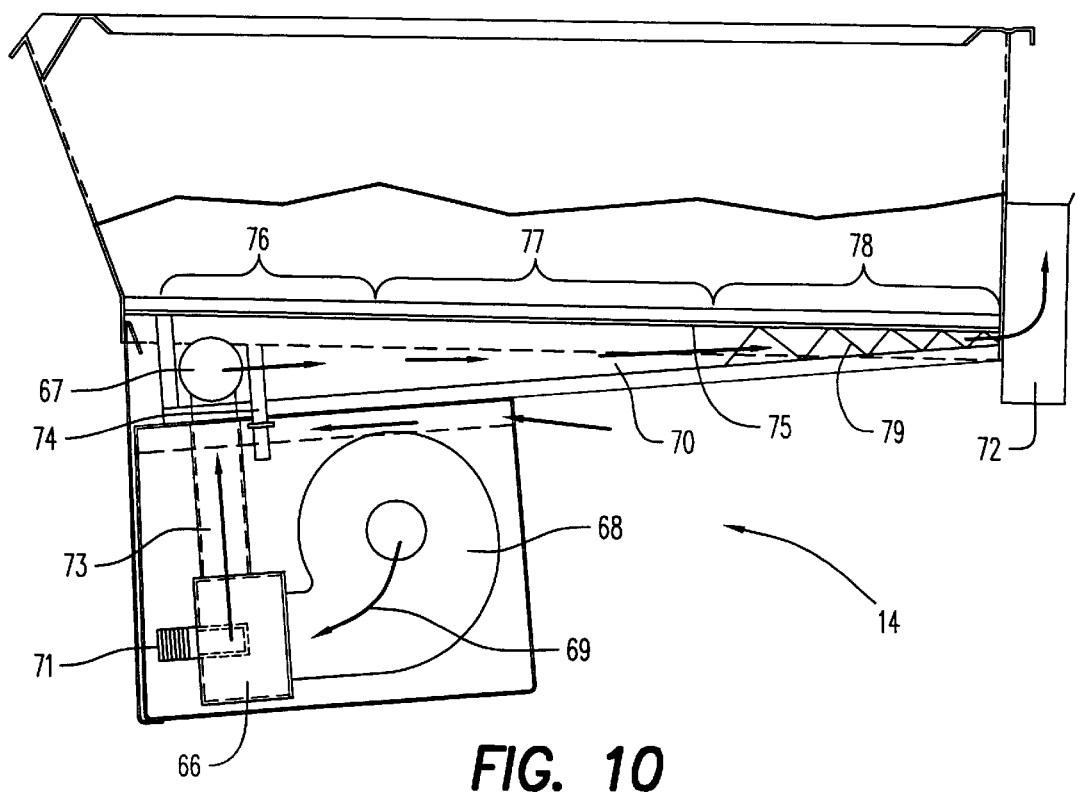
FIG. 10 is a side view of the gas component assembly of FIG. 6 detailing the operation of one embodiment of a gas combustion chamber of the present invention.

Operation of a gas component assembly 14 of the present invention may be understood with reference to FIG. 10. Fan 68 provides air to the air and gas mixing chamber 66. The air flow through the gas component assembly 14 is indicated by arrows 69. The air flows from the fan 68 and into mixing chamber 66. Gas may also be provided to the mixing chamber 66 through nozzle 71. The air and gas mix within the mixing chamber 66 assisted by the turbulence induced as a result of the orthogonal shape of the mixing chamber. The air and gas mixture then flows through a tubular manifold runner 73 which ensures smooth efficient laminar delivery of the mixture to a burner assembly 67. The mixture may then be ignited by pilot 74 and burned as it passes from the burner assembly 67 through gas combustion chamber 70 and out through flue 72. The resultant combustion of the air and gas mixture may establish three interrelated zones of surface 75 heating effect. Zone I 76 may experience direct flame contact over burner 67. Zone II 77 may act as an open plenum chamber that provides a saturated plate effect to the heated surface 75. Zone III 78 may use a controlled flame pattern baffle 79 to distribute heat evenly to surface 75.

Figure 11:
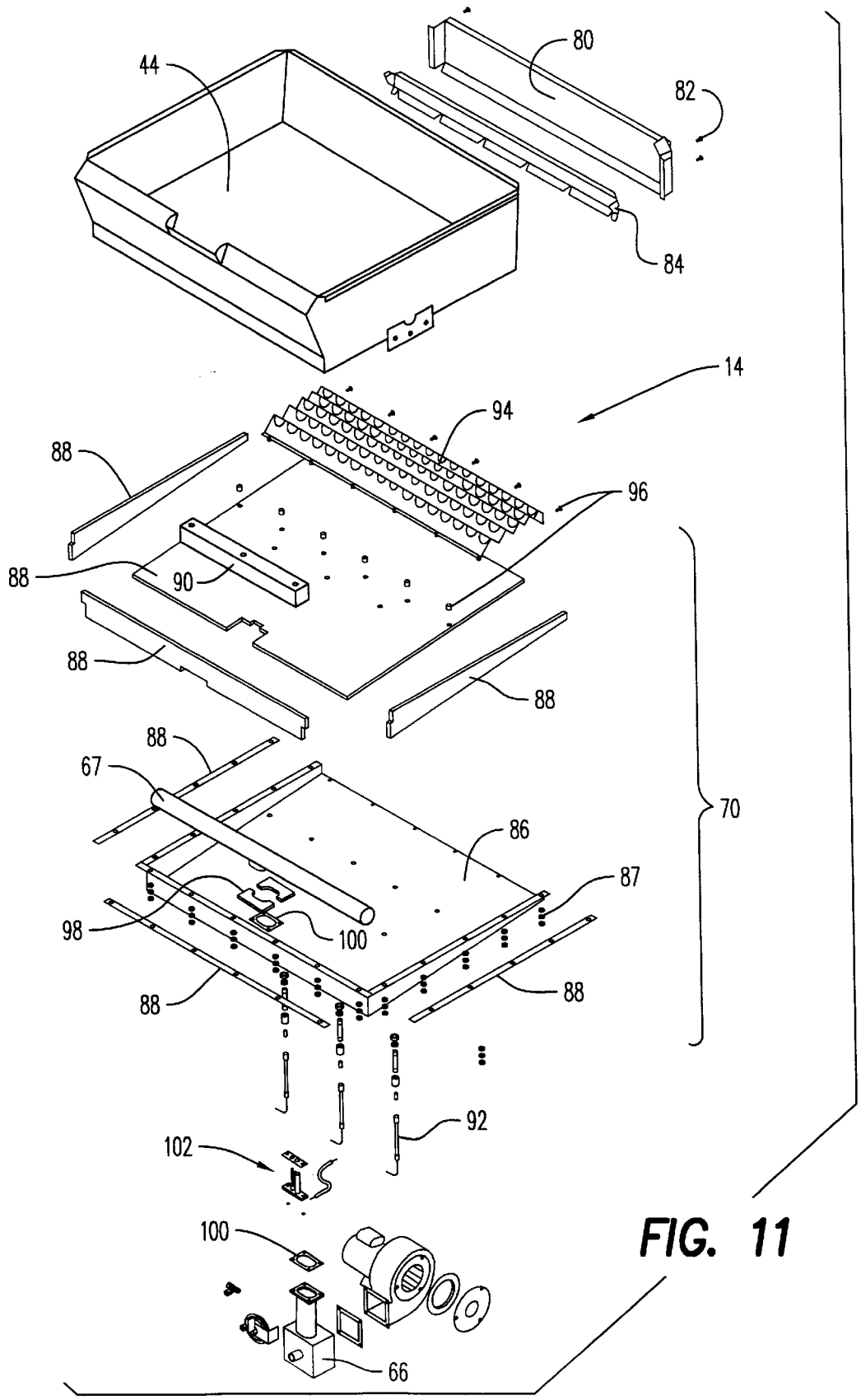
FIG. 11 is an exploded perspective view of the gas component assembly of FIG. 6.
Figure 12:
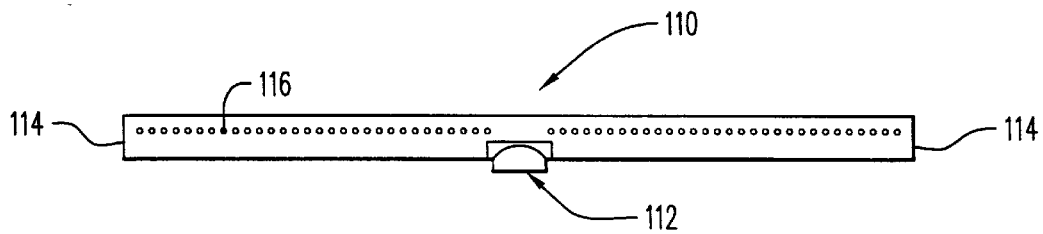
FIG. 12 is a rear view of one embodiment of an inner distribution tube of a burner assembly of the present invention.
Figure 13:
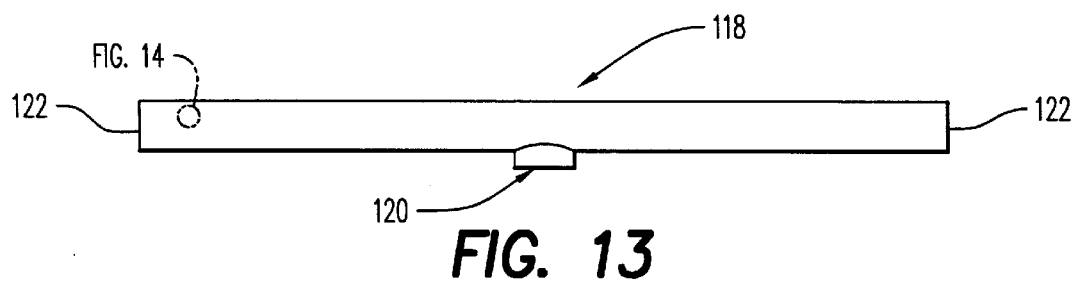
FIG. 13 is a rear view of one embodiment of an outer shell of a burner assembly of the present invention.
Figure 14:
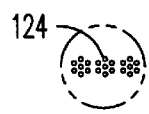
FIG. 14 is a detail view of the outer shell of FIG. 13.

FIG. 11 shows an exploded view of the gas component assembly 14. Pan assembly 44 may have a flue deflector 80 attached with fasteners 82 and an inner flue 84 within the flue deflector 80. The inner flue 84 may serve to deflect direct heat from the combustion chamber away from the side consoles and cooking apparatus frame. The inner flue 84 may also serve to reduce the temperature of the flue deflector 80. Gas combustion chamber 70 may include a burner pan 86 which may be attached to the floor of a pan assembly 44 using fasteners 87. The burner pan 86 serves to control the combustion in the combustion chamber 70 by the angle of the burner pan in relation to the pan assembly 44. Additionally, the burner pan serves as a heat shield. Insulation 88 may be optionally provided to the inside of the burner pan 86. Thermocouple insulation 90 may also be provided to protect thermocouples 92 from extraneous heat. Thermocouples 92 may be used to control thermal expansion of pan 94. A baffle 94 may be attached to the burner pan 86 using fasteners 96. Fasteners 96 may comprise studs with brass nuts. Use of stainless steel nuts may cause the nuts to seize on the studs. Burner assembly 67 may be attached to the burner pan 86 using fasteners 96. Burner assembly 67 may be connected to mixing chamber 66 through burner-ignitor insulators 98, and burner mounting gaskets 100. Pilot assembly 102 may also be attached to burner pan 86 adjacent the burner assembly 78.

Figure 15:
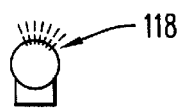
FIG. 15 is a right side view of the outer shell of FIG. 13.
Figure 16:
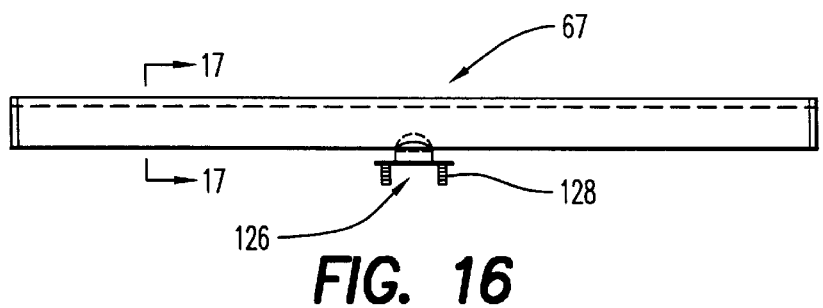
FIG. 16 is a rear view of one embodiment of a burner assembly of the present invention.
Figure 17:
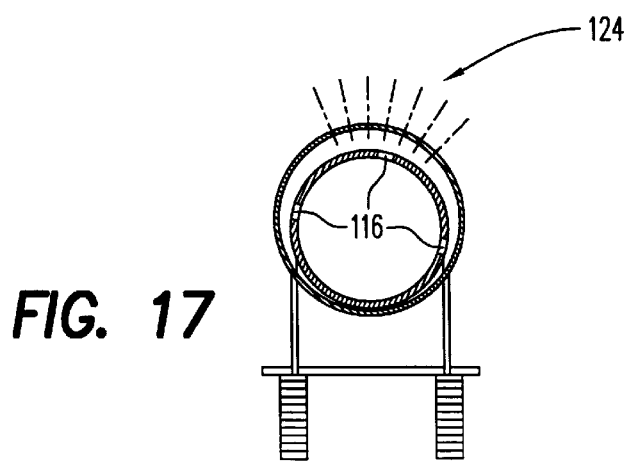
FIG. 17 is a sectional view of the burner assembly of FIG. 16 taken along line 17—17.

The burner assembly 67 may be understood with reference to FIGS. 12–17. An inner distribution tube 110 may have a central opening 112 for receiving an air/gas mixture, closed ends 114 and a series of exit holes 116. Exit holes 116 may be positioned about inner distribution tube, 110 and sized to provide an evenly balanced supply of the air/gas mixture across its extent. For example, the holes toward either end may be larger and/or more numerous than near the central opening 112. An outer shell 118 may have a central opening 120, closed ends 122 and a series of exit holes 124, an example of which may be seen in detail in FIG. 14. An end view of outer shell 118 is shown in FIG. 15 where it is made apparent that a majority of the holes 124 may be directed toward the rear of the cooking apparatus. Burner assembly 68 may have a burner mounting flange 126 and studs 128. It is also apparent from FIG. 17 that the holes 116 of the inner distribution tube and the holes 124 of the outer shell may be directed toward the rear of the cooking apparatus.

Figure 18:
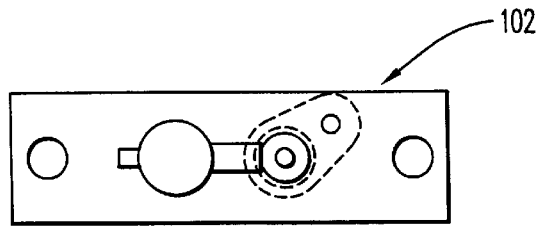
FIG. 18 is an overhead view of one embodiment of an pilot of the present invention.
Figure 19:
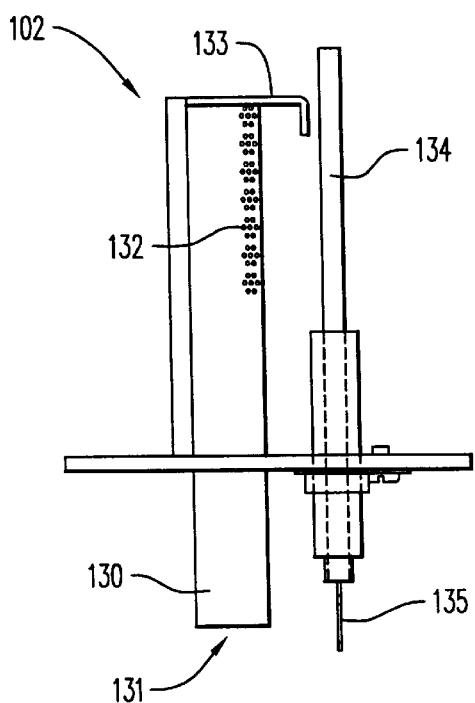
FIG. 19 is a rear view of the pilot of FIG. 18.
Figure 20:
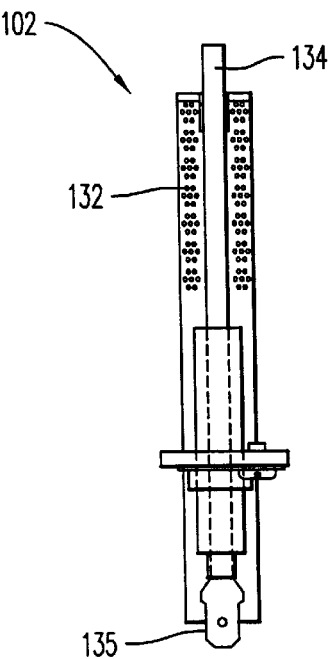
FIG. 20 is a left side view of the pilot of FIG. 18.

Referring now to FIGS. 18–20, pilot assembly 102 may include an air/gas mixture restrictor 130 with exit holes 132 facing ignitor 134. The pilot assembly 102 may have an electrical ignition system comprising ground contact 133 and a high tension connection 135. In operation, a pressurized air/gas mixture is supplied to restrictor 130 at 131 which flows through the restrictor 130 and out of holes 132. A spark may be created across the ground contact 133 and ignitor 134 to ignite the air/gas mixture. The pilot assembly 102 serves to ignite the burner more smoothly, effectively, and faster than previous pilot systems.

Figure 21:
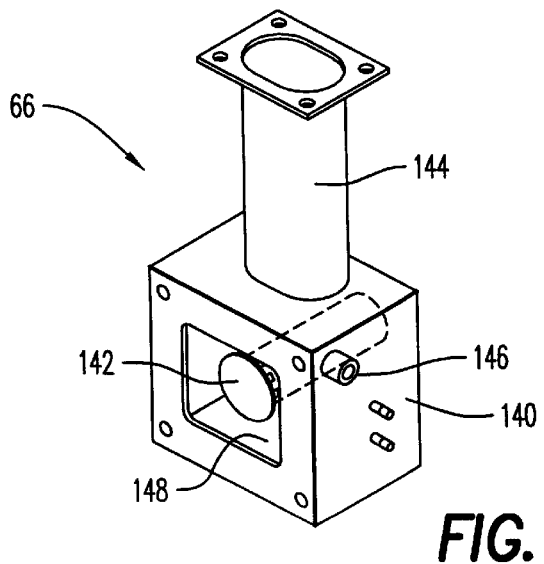
FIG. 21 is a perspective view of one embodiment of an air and gas mixing chamber assembly of the present invention.

FIG. 21 is a perspective view of an air and gas mixing chamber assembly 66 which preferably comprises an orthogonal mixing chamber weldment 140, a pintle style gas injection nozzle 142, a tubular manifold runner 144, and a coupling 146. Preferably, the nozzle 142 is square and centered in the mix chamber opening 148. Air may be forced into the mixing chamber 140 through an opening 148 and fuel gas may be supplied to the nozzle 142. The orthogonal shape of the mixing chamber 140 serves to induce turbulence to the air and gas flows to encourage thorough mixing of the two flows. The tubular manifold runner 142 ensures smooth efficient laminar delivery of the air and gas mixture to a distribution manifold of a burner assembly. The coupling 146 may supply air and gas mixture to the pilot assembly 102.

FIGS. 22–24 show a detailed view of one embodiment of a controlled flame pattern baffle 94 of the present invention. The baffle 94 has a front 160 and a rear 162. The baffle 94 may be formed from a single sheet of material having holes 164 of various size and location designed to control the combustion gas travel pattern. Bend lines 165 in FIG. 24 indicate one example of how a sheet of material may be formed into a baffle 94. Alternatively, the baffle 94 may be comprised of a series of angles or channels. The single sheet triangular baffle, however, provides increased stiffness which resists warpage better than a baffle comprised of angles or channels. The triangular baffle also creates an overall greater restriction because of the double sides to each restriction. Fan speed may compensate for the amount of restriction created by the baffle. It is to be appreciated that fan speed and/or baffle restriction will change with the overall size and capacity of the gas cooking apparatus.

The smaller holes 166 in the center of baffle 94 block heat to the middle of the baffle and improve heat distribution to the sides of the baffle. The baffle may have graduated restrictions which increase from the front to the rear determined by the size of triangle sides and/or the number of triangles, as seen in FIG. 23. The holes 164 may be triangular, circular or of any other appropriate shape known to those skilled in the art.

The baffle 94 may also serve to muffle the sound of the combustion occurring within the combustion chamber. This is especially important with powerful burners which are exceptionally noisy.

The present invention eliminates the need for an expensive high volume blower fan. The present invention combines and/or reduces the number of components existing in a conventional design and thereby simplifies assembly and minimizes manufacturing costs. Improved pilots provide immediate large burner ignition. The present invention improves serviceability by allowing access to all components from the front and by allowing removal of the entire gas component assembly.

The present invention has been described in the form of preferred embodiments, but it is to be recognized that several modifications and variations to the invention could be made which fall within the scope of the subjoined claims.

What is claimed is:

1. A cooking apparatus having a surface to be heated, comprising:
    a burner pan attached underneath said surface to thereby enclose a gas combustion chamber;
    a burner enclosed within said combustion chamber; and
    a single sheet baffle enclosed within said combustion chamber, said baffle having a plurality of various size openings for controlling combustion gas travel for evenly distributed heat distribution.

2. The gas cooking apparatus of claim 1, wherein said gas combustion chamber has a cross-sectional area which tapers from a front portion of said cooking apparatus down towards a rear portion of said cooking apparatus.

3. The cooking apparatus of claim 1, wherein said burner is positioned in said combustion chamber at a front portion of said cooking apparatus.

4. The gas cooking apparatus of claim 1, wherein said baffle is positioned in said combustion chamber at the rear portion of said cooking apparatus.

5. The gas cooking apparatus of claim 1, wherein said baffle has a series of graduated restrictions for controlling combustion gas propagation through said combustion chamber.

6. The gas cooking apparatus of claim 5, wherein said restrictions are larger in size in the middle of said baffle than toward either end.

7. The gas cooking apparatus of claim 1, wherein said openings of said plurality of various size openings located in the middle of said baffle are smaller in size than those openings at the edge of said baffle.

8. The gas cooking apparatus of claim 7, wherein said openings vary in size to control combustion gas propagation.

9. The gas cooking apparatus of claim 8, wherein said openings are smaller towards the center of said baffle than towards either end.

10. The gas cooking apparatus of claim 7, wherein said openings are circular in shape.

11. The gas cooking apparatus of claim 7, wherein said openings are triangular in shape.

12. The gas cooking apparatus of claim 1, wherein said baffle comprises a series of channels having openings.

13. The gas cooking apparatus of claim 1, further comprising a flue deflector attached to said burner pan.

14. The gas cooking apparatus of claim 13, further comprising an inner flue attached to said burner pan and enclosed within said flue deflector.

15. The gas cooking apparatus of claim 1, further comprising a high/low gas power switch operably connected to said apparatus.

16. The gas cooking apparatus of claim 1, further comprising an air and fuel mixing chamber in communication with said burner.

17. The gas cooking apparatus of claim 16, further comprising a tubular manifold in communication between said burner and said mixing chamber.

* * * * *